(12) United States Patent
Walker et al.

(10) Patent No.: US 8,132,301 B2
(45) Date of Patent: Mar. 13, 2012

(54) WORM THREAD CLAMP

(75) Inventors: Jason Walker, Hanau (DE); Mathias Krauss, Nidderau (DE)

(73) Assignee: NORMA Germany GmbH, Maintal (DE)

( * ) Notice: Subject to any disclaimer, the term of this patent is extended or adjusted under 35 U.S.C. 154(b) by 578 days.

(21) Appl. No.: 12/327,252

(22) Filed: Dec. 3, 2008

(65) Prior Publication Data
US 2009/0139064 A1   Jun. 4, 2009

(30) Foreign Application Priority Data

Dec. 4, 2007 (DE) .......................... 10 2007 058 319

(51) Int. Cl.
*A44B 1/04* (2006.01)
*A44B 11/25* (2006.01)
*A44B 17/00* (2006.01)
(52) U.S. Cl. ......................... 24/274 R; 24/279
(58) Field of Classification Search ............... 24/274 R, 24/279; 285/252, 253, 254; 29/525.12
See application file for complete search history.

(56) References Cited

U.S. PATENT DOCUMENTS

| 2,571,659 | A | * | 10/1951 | Bergstrom | 24/274 R |
| 3,351,989 | A | * | 11/1967 | Cheris et al. | 24/274 R |
| 4,099,304 | A | * | 7/1978 | Luc | 24/274 R |
| 4,813,109 | A | * | 3/1989 | McCully et al. | 24/278 |
| 5,560,087 | A | * | 10/1996 | Marques | 24/274 R |
| 5,706,558 | A | * | 1/1998 | Sauer | 24/279 |
| 5,809,619 | A | * | 9/1998 | Schaub | 24/274 R |
| 6,000,104 | A | * | 12/1999 | Mann | 24/274 R |
| 6,449,813 | B2 | * | 9/2002 | Keller et al. | 24/274 R |
| 6,845,549 | B2 | * | 1/2005 | Keller et al. | 24/274 R |
| 7,467,442 | B2 | * | 12/2008 | Chen | 24/281 |
| 7,765,650 | B2 | * | 8/2010 | Bowater et al. | 24/274 R |

FOREIGN PATENT DOCUMENTS

| DE | 19633435 | 2/1998 |
| FR | 532057 | 1/1922 |
| FR | 2781865 | 2/2000 |

* cited by examiner

*Primary Examiner* — Robert J Sandy
*Assistant Examiner* — Abigail E Morrell
(74) *Attorney, Agent, or Firm* — Greenblum & Bernstein, P.L.C.

(57) ABSTRACT

Worm thread clamp and method of forming worm thread clamp. The worm thread clamp includes a tension strap having end sections arranged to overlap in a circumferential direction to form a radially inner end section and a radially outer end section, a housing connected to the radially inner end section, and a tension screw arranged in the housing to engage thread elements on the radially outer end section. The radially inner end section is arranged to project from the housing in the circumferential direction and includes a bridge, and a weakening area is enclosed in the bridge. The instant abstract is neither intended to define the invention disclosed in this specification nor intended to limit the scope of the invention in any way.

19 Claims, 1 Drawing Sheet

WORM THREAD CLAMP

CROSS-REFERENCE TO RELATED APPLICATIONS

The present application claims priority under 35 U.S.C. §119 of German Patent Application No. 10 2007 058 319.4 filed Dec. 4, 2007, the disclosure of which is expressly incorporated by reference herein in its entirety.

BACKGROUND OF THE INVENTION

1. Field of the Invention

The invention relates to a worm thread clamp with a tension strap that has end sections overlapping one another in the circumferential direction, a housing connected to the radially inner end section and a tension screw arranged in the housing. The screw is in engagement with thread elements on the radially outer end section, and the radially inner end section projects over the housing with a bridge in the circumferential direction.

2. Discussion of Background Information

A worm thread clamp of this type is known, for example, from German Patent No. DE 196 33 435 C1.

The housing of a worm thread clamp should terminate flush with the tension strap on the radial inner side of the tension strap so that a component, for example, a hose, to be attached with the aid of the worm thread clamp is loaded with pressure as uniformly as possible over the entire circumference. The housing hereby often has a retaining rib that is arranged on the radial inner side of the radially inner end section. The bridge, that is, the part of the radially inner end section that at the end of the radially inner end section projects out of the housing or projects over the housing, serves as counter-bearing for the clamping head that has the housing and the tension screw. The bridge ends at a certain distance from the housing so that a shoulder on the inside of the tension strap is as soft as possible so as to avoid damage to a hose as much as possible. However, this results in a doubling of the material of the tension strap in the area where the bridge and the radially outer end section of the tension strap lie one on top of the other. The bending stiffness and thus also the molding behavior of the clamp strap on the hose suffer through this doubling of material. This arrangement can have a negative impact with respect to the tightness of a connection secured with the hose clamp between a hose and a support, particularly with a smaller nominal diameter. In an extreme case, the bridge could even prevent the molding of the clamp strap onto the hose. In this event, the worm thread clamp can jam before it has reached the diameter necessary for clamping, which results in a failure of the connection system. This failure can also lead to an increased risk of injury to the operator, since the torque rises during clamping of the worm thread clamp, but the worm thread clamp is not prevented from rotation by the hose. The complete momentum must be absorbed by the operator holding the worm thread clamp.

It is known to reduce the bending stiffness of the bridge in sections by transverse ribbing. However, the tool wear is relatively great with the embodiment with transverse ribbing. Furthermore, the material hardness of the clamp strap plays a major role here.

SUMMARY OF THE INVENTION

Accordingly, a worm thread clamp is provided with good processability at low expenditure.

According to embodiments of the invention, a worm thread clamp of the type mentioned at the outset includes a bridge having an enclosed weakening area.

The bending stiffness of the bridge is reduced through the weakening area. However, the weakening area does not extend through to an edge of the bridge at any point, so that the outer contour of the bridge remains unchanged compared to a bridge without a weakening area. It is thus possible to ensure, for example, that no interfering edges or the like are present that could have a negative impact on the production or the handling of the worm thread clamp. The idle torque is kept at a very low and above all constant level up to the smallest diameter of the worm thread clamp, which has a positive impact on the clamping force of the worm thread clamp. The torque dispersion is also reduced to a minimum. The ease of assembly of the clamp is increased and the risk of injury to an operator is reduced.

Preferably the weakening area is embodied or formed as a cross-sectional reduction. The bridge therefore has less material in the weakening area, which could oppose resistance to a deformation.

Advantageously, the weakening area is embodied or formed as an opening. Material of the bridge is therefore lacking in the opening, so that this material no longer opposes any resistance to the deformation of the bridge. However, the opening is completely enclosed in the circumferential direction, and thus not open to the end of the clamp strap so that the bridge provided with the opening can in principle be handled just like a conventional bridge with a worm thread clamp.

Preferably, the weakening area is limited by a boundary that runs parallel to the outer contour of the bridge. The bridge thus has on its circumferential edge a web with an approximately constant thickness. The term "parallel" should not be understood here in the mathematically exact sense. Minor deviations from parallelism are easily permissible. The weakening area in principle has a scaled down shape of the shape of the bridge. The deformation behavior of the bridge can thus be easily controlled.

Preferably, the bridge has lateral flanks at least one of which is chamfered relative to the circumferential direction. The bending stiffness can also be reduced thereby. The bridge becomes ever narrower towards its free end, thus the end facing away from the housing, so that the bending stiffness decreases towards the free end. In connection with the weakening area, such a small deformation resistance can be realized here that the idle torque can be kept essentially the same over the complete tightening of the tension screw.

Preferably, the bridge has a point that from the interior bears against an axial edge area of the radially outer end section. Through the insertion of the thread element into the radially outer end section, under favorable circumstances deformations can also result on the radial inner side of the radially outer end section, which impedes a displacement of the free end of the bridge with respect to the radially outer end section. However, the thread elements are located in the axial center of the tension strap. An axial edge area remains free of thread elements. If the point of the bridge now bears against this free and thus smooth edge area, the thread elements cannot impede the advancement of the free end of the bridge and thus the tightening of the worm thread clamp.

Preferably, the point is arranged on the axial edge area, on which the radially outer end section has an insertion projection. The point of the bridge can thus be additionally used to thread the radially outer end section of the tension strap into the clamping head. The insertion projection is guided through the point of the bridge and subsequently the bridge itself.

Preferably, the bridge is provided with transverse grooves at least on its radial inner side. The transverse grooves also reduce the bending stiffness of the bridge. Since in particular with the embodiment of the weakening area as an opening, less material is deformed in order to produce the transverse grooves, the tool wear is lower.

Preferably, the transverse grooves leave free at least part of the weakening area. This is in particular an advantage when the weakening area is embodied or formed in a triangular shape. In this case, the reduction in bending stiffness through the weakening area is sufficient so that no additional transverse grooves are necessary.

Accordingly, embodiments of the invention are directed to a worm thread clamp that includes a tension strap having end sections arranged to overlap in a circumferential direction to form a radially inner end section and a radially outer end section, a housing connected to the radially inner end section, and a tension screw arranged in the housing to engage thread elements on the radially outer end section. The radially inner end section is arranged to project from the housing in the circumferential direction and includes a bridge, and a weakening area is enclosed in the bridge.

In accordance with aspects of the invention, the weakening area can include a cross-sectional reduction.

According to other aspects of the invention, the weakening area may include an opening.

According to still other aspects of the invention, the weakening area may be limited by a boundary arranged essentially parallel to edges of the bridge.

In accordance with other aspects of the invention, the bridge can include lateral flanks, at least one of which is chamfered relative to the circumferential direction.

Moreover, the bridge can include a point arranged to bear against an axial edge area of the radially outer end section. Further, the radially outer end section may include an insertion projection adjacent the axial edge area, and the point is arranged on the axial edge area.

According to aspects of the invention, the bridge may include transverse grooves arranged at least on a radially inner surface. The transverse grooves can leave at least part of the weakening area free.

Embodiments of the invention are directed to a method of forming a worm thread clamp. The method includes forming a bridge at an end of a tension strap, forming a weakening area within the bridge, coupling a housing to the tension strap so the bridge projects from the housing, and arranging an end of the tension strap opposite the bridge to overlap the bridge. In this manner, at least a portion of the bridge slides on a surface of the tension strap.

According to aspects of the invention, the bridge can include at least one chamfered surface relative to a length direction of the tension strap. The at least one chamfered surface may form a point at an end of the bridge, and the point can form the at least a portion of the bridge that slides on the surface of the tension strap.

In accordance with further aspects of the invention, the method can further include forming threads on a surface of the tension strap opposite the surface on which the at least a portion of the bridge slides. The at least a portion of the bridge that slides of the surface of the tension strap can be located in an area axially outside the threads.

The method may also include forming lateral grooves in a portion of the bridge. The lateral grooves can extend through the weakening area.

Embodiments of the invention are directed to a worm thread clamp that includes a tension strap having first and second ends that are overlappable in a circumferential direction to form an inner end and an outer end, a housing connected to the inner end, and the inner end including a bridge having an enclosed weakening area.

In accordance with still yet other aspects of the invention, the tension strap can include threads formed on a surface. Further, the bridge may include at least one chamfered edge relative to a length direction of the tension strap forming a point structured and arranged to slide on a surface of the tension strap opposite the threads. The point can be arranged to contact the surface of the tension strap opposite the threads in a region axially outside of the threads.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
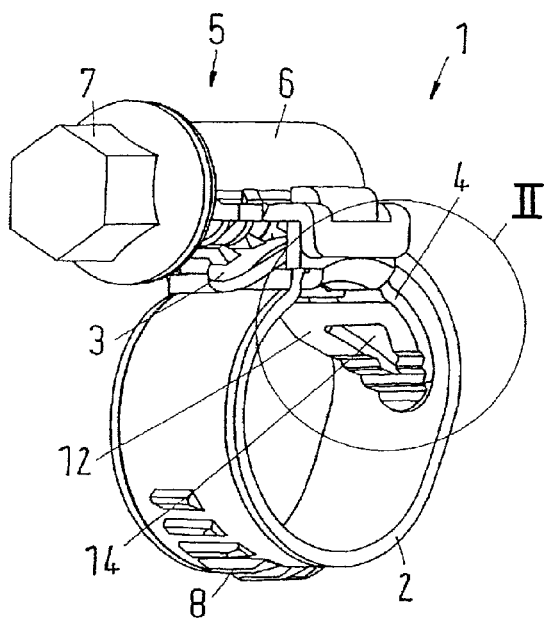
FIG. 1 illustrates a perspective view of a worm thread clamp according to embodiments of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

A worm thread clamp 1 has a tension strap 2 with two end sections 3 and 4. The two end sections 3 and 4 are arranged to overlap so that a radially outer end section 3 and a radially inner end section 4 result. Tension strap 2 is curved in an approximately circular manner, so that in principle a cylinder is formed. The following directional data, axial, radial and circumferential direction, therefore relate to the referenced cylinder.

A clamping head 5 has a housing 6 connected to radially inner end section 4, and a tension screw 7. Tension screw 7 is held in housing 6 in a permanent manner and is in engagement with thread elements 8 on the circumferential surface of tension strap 2. To this end radially outer end section 3 is guided between radially inner end section 4 and tension screw 7. By rotation of tension screw 7, radially outer end section 3 is moved so that the interior diameter of tension strap 2 of worm thread clamp 1 is changed.

Figure 2:
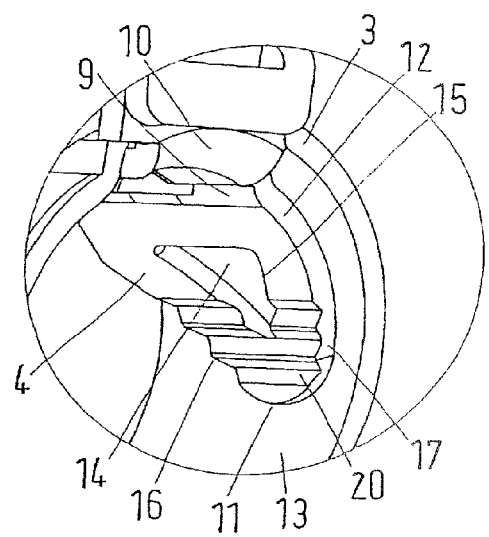
FIG. 2 illustrates in greater detail section II depicted in FIG. 1.

As can be seen in particular from FIG. 2, radially inner end section 4 forms a shape 9 with an approximately U-shaped cross section in which a web 10 of housing 6 is arranged such that the radial inner side of web 10 is installed approximately flush with the radial inside of radially inner end section 4.

Radially inner end section 4 projects towards its free end 11 beyond web 10 and thus forms a so-called bridge 12. Form 9 serves as counter-bearing to hold clamping head 5.

Bridge 12 bears against radial inside 13 of radially outer end section 3 during tightening. A doubling of the material of tension strap 2 results where bridge 12 is located.

In order to render possible a satisfactory shaping of tension strap 2 to a hose despite the material doubling when the hose is attached to a support, bridge 12 has a weakening area 14 in the form of an opening enclosed on all sides. The outer contour of bridge 12 is thus generally unchanged as compared to a bridge without weakening area 14. Thus, the handling of the worm thread clamp 1 according to the invention is substantially similar to the handling with hitherto known worm thread clamps with different bridge embodiments.

An essentially reduced bending stiffness of the bridge results from the embodiment of bridge 12 with the weakening 14, such as an opening, so that during the tightening of tension screw 7, and thereby during the tightening of worm thread clamp 1, bridge 12 has a relatively small idle torque that can be kept at a constant level up to the smallest diameter of worm thread clamp 1. This has a positive impact on the clamping force of worm thread clamp 1. The dispersion of the idle torque is also reduced to a minimum. The processability of worm thread clamp 1 is thereby improved, because less force is necessary to tighten the worm thread clamp until generation of the actual clamping force.

Weakening area 14 is limited by a boundary 15 that runs approximately parallel to an outer contour of bridge 12, i.e., weakening area 14 is a scaled down image of bridge 12.

In the present exemplary embodiment, as can be seen from FIG. 2, bridge 12 is embodied or formed in an approximately triangular manner. Free end 11 forms a point or apex, although the point may be rounded as shown in the exemplary illustration. Accordingly, weakening area 14 is also embodied or formed in an approximately triangular manner. As shown in the illustrated embodiment, bridge 12 has two lateral flanks 16 and 17 that formed at an angle with respect to the circumferential direction of tension strap 2, such that the sides of bridge 12 are chamfered.

During the tightening of worm thread clamp 1, free end 11, that is the point, bears against radial inner side 13 of radially outer end section 3. However, this arrangement is unproblematic as long as radial inner side 13 is embodied or formed in a smooth manner, as is the case in the exemplary embodiment of FIGS. 1 and 2.

Figure 3:
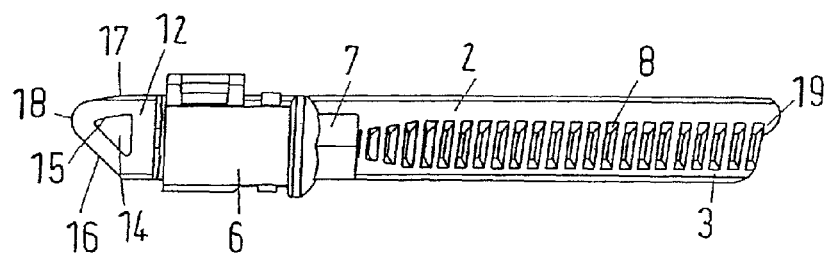
FIG. 3 illustrates an unwound worm thread clamp according to embodiments of the invention.

FIG. 3 shows a modified embodiment in which identical elements corresponding to one another are provided with the same reference numbers. Worm thread clamp 1 is shown in a state in which radially outer end section 3 has been pulled out of housing 6, i.e., tension strap 2 is unwound and lying flat.

In this exemplary embodiment, bridge 12 only includes a single chamfered lateral flank 16 forming a point 18 that bears against radially outer end section 3 from the inside in an area axially outside of thread elements 8. Because point 18 is arranged to bear against radially outer end section 3 in a region axially outside of thread elements 8, projections resulting on the inner side of radially outer end section 3, e.g., due to stamping of thread elements 8, do not hinder the smooth movement of bridge 12 over the radially outer end section 3.

Further, radially outer end section 3 has a threading projection 19 that is arranged on the same axial edge as point 18. Thus, when radially outer end section 3 is to be inserted into housing 6, threading projection 19 is guided over the greatest possible length onto bridge 12.

Bridge 12, as can be seen from FIGS. 1 and 2, can be provided with transverse grooves 20 on its radial inner side. Transverse grooves 20 can be limited, however, to an area where bridge 12 has not reached its full width. Transverse grooves 20 can cover weakening area 14 only in part, or can leave weakening area 14 completely free. Since here only a little material needs to be deformed, the tool wear is limited in the production of transverse grooves 20.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A worm thread clamp comprising:
    a tension strap having end sections arranged to overlap in a circumferential direction to form a radially inner end section and a radially outer end section;
    a housing connected to the radially inner end section;
    a tension screw arranged in the housing to engage thread elements on the radially outer end section;
    the radially inner end section being arranged to project from the housing in the circumferential direction and includes a bridge; and
    a weakening area enclosed in the bridge,
    wherein the bridge comprises transverse grooves arranged at least on a radially inner surface.

2. The worm thread clamp in accordance with claim 1, wherein the weakening area comprises a cross-sectional reduction.

3. The worm thread clamp in accordance with claim 1, wherein the weakening area comprises an opening.

4. The worm thread clamp in accordance with claim 1, wherein the weakening area is limited by a boundary arranged essentially parallel to edges of the bridge.

5. The worm thread clamp in accordance with claim 1, wherein the bridge comprises lateral flanks, at least one of which is chamfered relative to the circumferential direction.

6. The worm thread clamp in accordance with claim 1, wherein the bridge comprises a point arranged to bear against an axial edge area of the radially outer end section of the tension strap.

7. The worm thread clamp in accordance with claim 6, wherein the radially outer end section includes an insertion projection adjacent the axial edge area, and the point is arranged on the axial edge area.

8. The worm thread clamp in accordance with claim 1, wherein the transverse grooves leave at least part of the weakening area free.

9. A method of forming a worm thread clamp, comprising:
    forming a bridge at an end of a tension strap;
    forming a weakening area within the bridge;
    coupling a housing to the tension strap so the bridge projects from the housing; and
    arranging an end of the tension strap opposite the bridge to overlap the bridge, whereby at least a portion of the bridge slides on a surface of the tension strap, wherein the bridge comprises transverse grooves arranged at least on a radially inner surface.

10. The method in accordance with claim 9, wherein the bridge comprises at least one chamfered surface relative to a length direction of the tension strap.

11. The method in accordance with claim 10, wherein the at least one chamfered surface forms a point at an end of the bridge, and the point forms the at least a portion of the bridge that slides on the surface of the tension strap.

12. The method in accordance with claim 9, further comprising forming threads on a surface of the tension strap opposite the surface on which the at least a portion of the bridge slides.

13. The method in accordance with claim 12, wherein the at least a portion of the bridge that slides on the surface of the tension strap is located in an area axially outside the threads.

14. The method in accordance with claim 9, further comprising forming lateral grooves in a portion of the bridge.

15. The method in accordance with claim 14, wherein the lateral grooves extend through the weakening area.

16. A worm thread clamp comprising:
a tension strap having first and second ends that are overlappable in a circumferential direction to form an inner end and an outer end;
a housing connected to the inner end; and
the inner end including a bridge having an enclosed weakening area and transverse grooves arranged at least on a radially inner surface.

17. The worm thread clamp in accordance with claim 16, wherein the tension strap includes threads formed on a surface.

18. The worm thread clamp in accordance with claim 17, wherein the bridge includes at least one chamfered edge relative to a length direction of the tension strap forming a point structured and arranged to slide on a surface of the tension strap opposite the threads.

19. The worm thread clamp in accordance with claim 18, wherein the point is arranged to contact the surface of the tension strap opposite the threads in a region axially outside of the threads.

* * * * *